United States Patent [19]

Wise

[11] Patent Number: 5,173,649
[45] Date of Patent: Dec. 22, 1992

[54] METHOD AND APPARATUS FOR IMPROVING DYNAMIC RESPONSE OF A FEEDBACK CONTROL LOOP BY GENERATING A COMMON-MODE GAIN

[75] Inventor: William L. Wise, Mountain View, Calif.

[73] Assignee: Wise Instrumentation & Controls, Inc., Mountain View, Calif.

[21] Appl. No.: 783,282

[22] Filed: Oct. 28, 1991

[51] Int. Cl.$^5$ .............................................. G05B 5/01
[52] U.S. Cl. ..................................... 318/615; 318/611; 318/619; 318/632
[58] Field of Search ................ 318/560, 561, 609–611, 318/615–621, 632

[56] References Cited

U.S. PATENT DOCUMENTS

| | | | |
|---|---|---|---|
| 4,030,132 | 6/1977 | Iftikar et al. | 360/78 |
| 4,071,886 | 1/1978 | Eicher | 364/118 |
| 4,446,409 | 5/1984 | Rawicz et al. | 318/632 |
| 4,498,036 | 2/1985 | Salemka | 318/561 |
| 4,839,573 | 6/1989 | Wise | 318/615 |

*Primary Examiner*—Bentsu Ro
*Attorney, Agent, or Firm*—Townsend and Townsend

[57] ABSTRACT

A main feedback system regulates an output parameter of interest, such as velocity, versus a given range of load parameters, such as torque and inertia. An element feedback system rapidly adjusts an in-series-path zero to frequency track (cancel) a varying load-caused pole—including in-range variations of 100:1. Since zero-setting is inverse to an adjusted resistance required, a 100:1 zero range causes a highly non-linear resistance transmission, affecting the element loop's gain but not that of the main control feedback loop. By introducing a variable resistance of the same value as used in the main feedback system as a divider in the element feedback loop only, the element loop gain is made substantially constant over the entire pole-tracking range, and the element loop's bandwidth is made substantially constant over the same range, and thus rendering the dynamic response substantially constant over the same range. To avoid differential temperature effects on the same-value resistances, both are referenced to a common heat sink.

11 Claims, 4 Drawing Sheets

METHOD AND APPARATUS FOR IMPROVING DYNAMIC RESPONSE OF A FEEDBACK CONTROL LOOP BY GENERATING A COMMON-MODE GAIN

CROSS REFERENCE TO RELATED INVENTION

This invention is related to commonly-owned U.S. Pat. No. 4,839,573 issued Jun. 13, 1989 for METHOD AND APPARATUS FOR FEEDBACK CONTROL LOOP BANDWIDTH AND PHASE MARGIN REGULATION. The content of that patent is incorporated herein by reference and made a part hereof.

BACKGROUND OF THE INVENTION

This invention relates to feedback control loop systems. More particularly, it relates to feedback control loop systems for controlling elements which have a variable gain and frequency response and which produce an output signal proportional to the element gain and its frequency response. A common-mode gain is applied to an element feedback loop, inversely, to approximately equalize loop-gain and bandwidth in the element's feedback loop over the operating element-adjusted frequency range.

In most feedback control systems, the basic problem to be solved is generating and feeding back an error correction signal whose parameters are independent of any effects of gain or frequency response by the element to be controlled. For a control system in which the element under control produces a variable frequency response, it is desireable to generate a controllable "zero" to frequency match/cancel an independent, varying "pole" (such as reflected from varying load inertia) so as to provide a constant performance control feedback loop. According to a prior control system of the same inventor, as described in U.S. Pat. No. 4,839,573 issued Jun. 13, 1989, an element feedback loop is implemented for generating a compensating signal which adjusts the in-series "zero" in order to cancel a varying "pole" in the control loop's feedback response loop-gain, GH, where the varying "pole" results from varying load inertia reflected into the circuit. "Zero" adjustment is achieved by inversely varying the resistance of a variable resistive element (i.e., voltage-controlled resistor or resistor network). For "pole" and "zero" variations over a range of 100:1, the resistance control transmission becomes highly nonlinear. In particular, the prior element feedback loop adjusted a parameter (i.e., resistance) of a control element (adjustable resistive element, such as voltage controlled resistor or FET) to contribute to the determination of the frequency position of a "zero" used to offset an independent, variable, load-associated "pole." However, the frequency response of such control element is highly non-linear. As a result, the loop-gain and bandwidth of the element feedback loop vary non-linearly with changes in the system frequency range and dynamic load response. Accordingly, a linearized method and apparatus is needed within the "zero" element's feedback loop for keeping the loop-gain and bandwidth of such loop relatively constant over a wide range of "pole" (and "zero") frequencies, thereby automatically regulating loop-gain of the second or element feedback loop under dynamic response conditions.

SUMMARY OF THE INVENTION

According to the invention, common mode gain is applied to a main control feedback loop and an element feedback loop to achieve pole-tracking over a wide frequency range under dynamic load response conditions. Such pole-tracking is desired to achieve self-adjusting bandwidth and phase margin regulation over such frequency range for such load conditions. Accordingly, common-mode gain is applied to the main control loop and element feedback loop according to this invention to offset the non-linearity and achieve an approximately constant loop-gain and bandwidth for the element feedback loop.

According to one aspect of the invention, common-mode gain is applied by including a second adjustable resistive element in the element feedback loop. Such second adjustable resistive element receives the same signal as applied to a first adjustable resistive element. The second resistive element is inverse relative to the first resistive element so that the element feedback loop-gain, GH, is substantially constant despite the high non-linearity of the controlled parameter's frequency response.

According to another aspect of this invention, dynamic pole tracking of the load-associated pole is achieved over a frequency range varying by a factor of 100. A gain normalization circuit is included in the element feedback loop for offsetting the non-linear response of the first adjustable resistive element.

According to another aspect of the invention, the two adjustable resistive elements are mounted to a common heat sink to exclude differential temperature-caused changes in the two resistive elements, especially over wide ranges of ambient temperature.

The invention will be better understood by reference to the following detailed description taken in conjunction with the accompanying drawings.

DESCRIPTION OF SPECIFIC EMBODIMENTS

Definitions and Coding Notations

Feedback control loops are characteristic of velocity motion control systems and other servo control systems. In a servo control system, a condition (i.e., velocity) is maintained at or near a predetermined value by control-activation of a servo actuator (i.e., motor/actuator via power amplifier). The required condition (e.g., desired velocity) is compared to the actual condition (e.g., sensed velocity) resulting in a difference (or rate of difference) which is used for adjusting the active element/servo actuator. A stable control loop occurs when the actual condition converges to the desired condition without oscillation or self-induced perturbations.

Servo control systems typically are designed and analyzed based upon frequency domain relationships, but are proof-tested based on real-world time-domain relationships. Frequency domain and time domain representations are well modelled. Frequency domain loop bandwidth and phase margin are related to time domain rise/fall time and step-response overshoot by LaPlace transforms. Frequency domain terms of significance include "pole" and "zero". A "pole" is a transmission intersection of two asymptotes in a log gain/log frequency response curve, where transmission drops at 6 dB/octave at frequencies above the pole relative to transmission below the pole. A "zero" is a transmission intersection of two asymptotes in a log gain/log frequency response curve, where transmission rises at 6 dB/octave at frequencies above the zero relative to transmissions below the zero.

The coding notation used to denote a pole is as follows:

$$<P_X> = (1 + jf/P_X) = [1 + (f/P_X)^2]^{0.5} at - atan(f/P_X)$$
$$\text{(magnitude)} \quad \text{(phase)}$$

The coding notation used to denote a zero is as follows:

$$<Z_Y> = (1 + jf/Z_Y) = [1 + (f/Z_Y)^2]^{0.5} at + atan(f/Z_Y)$$
$$\text{(magnitude)} \quad \text{(phase)}$$

Note that when $<Z_Y> = <P_X>$, transmission is 1.0X at 0 degrees (e.g., like wire) since both magnitudes and phases cancel. By setting the GH equation in FIG. 2A format, frequency domain design can be carried out with little to no breadboarding, with system performance predictable with true precision.

In real systems, $P_J$ is ME/inertia pole, $P_{EE}$ is an L/R modified EE pole, $P_{DR}$ is power amplifier's I-REG loop bandwidth, $P_{FO}$ is the sensor's filter pole and $P_V°$ is GH's dominant low frequency bandwidth setting pole.

Prior Art Velocity Motion Control System

Figure 1:
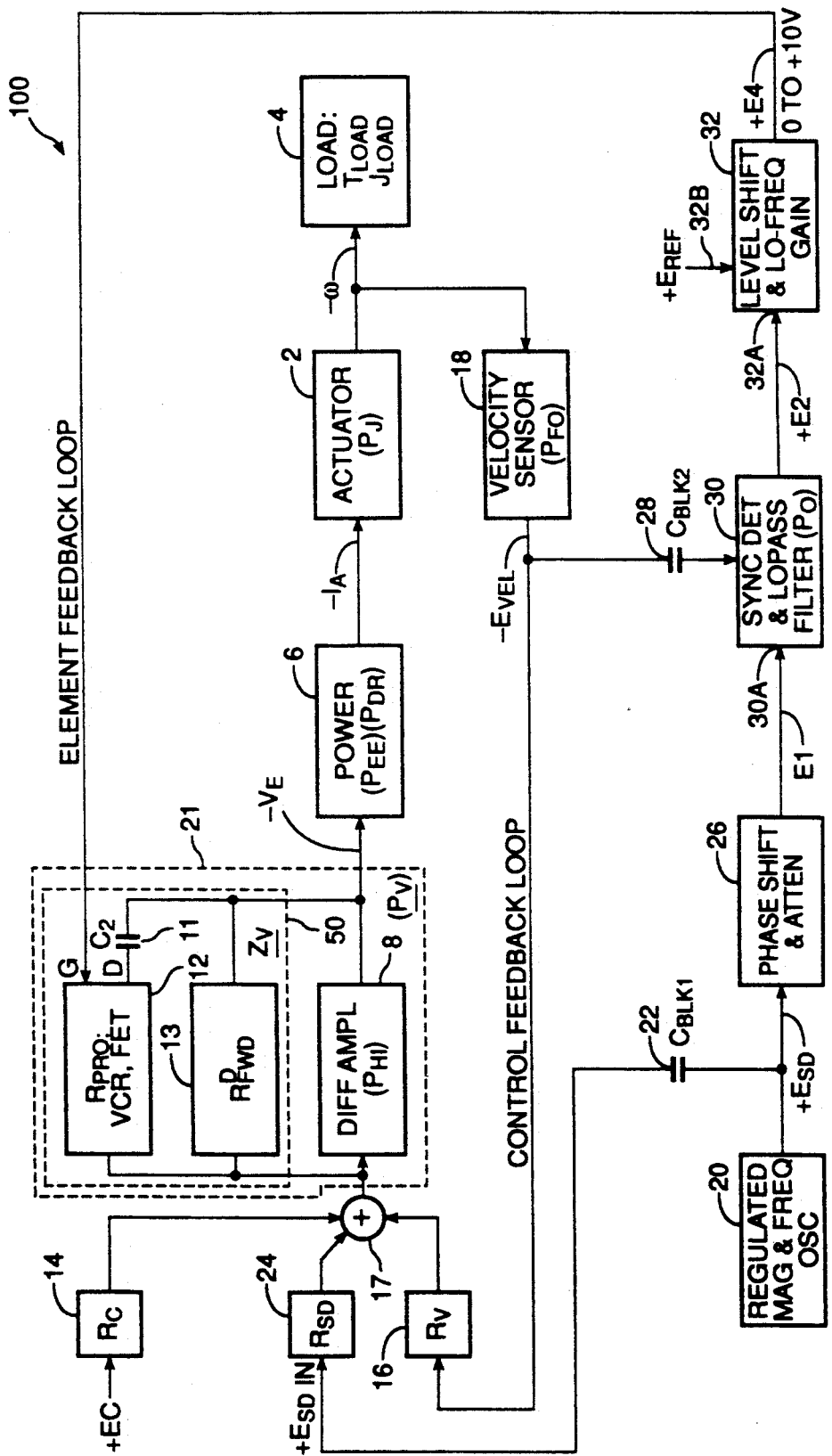
FIG. 1 is a block diagram of a prior art velocity control system.

FIG. 1 shows a prior art velocity motion control system 100. A conventional inverting-input, high-gain differential amplifier 8 operative as an automatically compensating error amplifier 21 is coupled to power amplifier 6, which in turn is coupled to actuator 2, or motion controller, which in turn is coupled to drive load 4 and velocity sensor 18. The velocity sensor 18 is in both the main control (velocity) and the element ($R_{PRO}$) feedback loops. Sensor 18 is coupled to a feedback-scaling $R_v$, element 16, which in turn is coupled to a zero-seeking summing junction 17. Element 18 also couples to block 30 via coupling element 28. The summing junction 17 also receives a control signal $E_c$ via scaling element 14 ($R_c$), as well as "pole-tracking" signal, $E_{SD}$, via scaling element 24, $R_{SD}$, and coupling element 22. Error amplifier's 21 forward impedance comprises the parallel effect of forward resistance element (RFWD) 13 versus the series combination of scaling resistance element (RPRO) 12 and capacitor (C1) 11, such that the dominant low frequency pole, $P_V°$, is fixed, correctly located and $Z_V$ via $R_{PRO}$, has the proper "pole-tracking" frequency range. Therefore, the velocity feedback transfer function of differential amplifier 8, ignoring command and $E_{SD}$ inputs, is given by:

$$V_E/E_{VEL} = -(R^D_{FWD}/R_V) \left[ \frac{\text{(vary)}}{[<P_V> \; F_{BW} \; <P_{HI}>]} \right]$$
$$\text{(fixed)} \; \text{(vary)} \; \text{(vary)}$$
$$\leftarrow \text{Log Lo-freq} \quad \text{log hi-freq} \rightarrow$$

Where:
$Z_V$ may vary;
$F_{BW}$ may vary from 100 Hz to 1 kHz;
$P_{HI}$ may vary from 5.5 kHz to 275 kHz; and
$P_{HI}$ = (amplifier 8 Gain * bandwidth)/(1 + $R_{PRO}R_v$).

Command signals are applied to the control system 100 at a command input in the form of a (voltage) control signal $E_c$ 14 to the summing means 17 via resistor $R_C$ 14. A synchronously-detectable signal $E_{SD}$ injected via second scaling element 24 ($R_{SD}$) to the summing junction 17 at a signal level which is relatively low compared to other signals at the summing junction is at a set frequency near the preset velocity closed-loop bandwidth, $F_{BW}{}^{VEL}$, of the main control feedback loop.

The loop-gain equation for the main/control feedback loop is:

$$GH_{VEL} = (G^{DIFF}_{VEL})(G_{PWR\;AMP})(G_{ACTUATOR})(G_{SENSOR}); \text{ or}$$

$$GH_{VEL} = -(R^D_{FWD}/R_v)(E_{VEL}/V_E) \left[ \frac{(1-E)<Z_v>}{[<P_v><P_J>F_{BW}<P_{Fo}><P_{EE}><P_{HI}><P_{DR}>]} \right]$$
$$\text{(fixed)} \quad \text{(set)} \quad \text{(fixed)} \quad \text{(fixed)}$$
$$\text{(vary)} \quad \text{(fixed)} \quad \text{(vary)}$$
$$\leftarrow \text{Log Lo-freq} \quad\quad\quad\quad \text{log hi-freq} \rightarrow$$

Also provided is an element feedback loop comprising well-regulated oscillator 20 for generating a synchronously-detectable signal $E_{SD}$ at a frequency $F_{SD}$, which signal is coupled to a preset phase shifter 26 as well as to a signal scaling element ($R_{SD}$) 24 (via a first voltage blocking capacitor ($C_{BLK1}$) 22). The output signal of the fixed phase shifter 26, designated E1, is coupled to one signal input 30A of a conventional synchronous detector (which includes an output low-pass filter) 30. The output of the velocity sensor 18, namely, signal $E_{VEL}$ (which includes $F_{SD}$ therein) is also coupled (via a second blocking capacitor ($C_{BLK2}$) 28) to a second signal input 30B of the synchronous detector 30. The standard synchronous detector 30 is operative to provide as an output signal a varying DC-plus-narrow-bandwidth voltage E2 whose level is proportional to the degree of phase synchronism between the signals applied at the inputs 30A and 30B and the combined magnitude of the signals, which is a direct function of $R_{PRO}$ and $<P_J>$.

The DC voltage part of E2 (32A) is compared to $+E_{REF}$ 32B, with the difference signal amplified and level-shifted by low-frequency gain amplifier 32. Amplifier 32 shifts and scales the varying DC voltage E2 relative to $E_{REF}$ to condition it as a signal E4 which sets $R_{PRO}$.

The output voltage E4 of the gain amplifier 32 is provided directly to the controlled element 12, shown by example as an analog voltage controlled resistance means (VCR) 12. (A simple example is a high-input-impedance field effect transistor (FET) having an $r_{ds}$ resistance controlled over a 100:1 range by a voltage signal E4 applied at its gate terminal G). A conventional bias network (not shown) may be provided to assure FET operation in its most, linear, non-saturating operating region.

The loop-gain equation for the element/supervisory feedback loop is:

$$GH_{SD} = -(E^{IN}_{SD}/R_{SD})(dR_{PRO}/dE4)(dE_{VEL}/dV_E)(G_{SD})(G_{LPF})(G_{LS})$$

$$= -(E^{IN}_{SD}/R_{SD})(E_{VEL}/V_E) \ [(G_{SD})(G_{LPF})(G_{LS})/(1 + jF^{VEL}_{BW}/F_{SD})]$$

$$@ f < P_J$$

$$* [(R_{PRO}/E4)/(1 + jF_{SD}/P_J)]$$

$$= K_{SD} * [(R_{PRO}/E4)/(1 + jF_{SD}/P_J)]$$

The prior art control system 100 is stable over a given frequency range for limited load response conditions. A difficulty with the prior art control system 100 is that the $R_{PRO}$ varies non-linearly for changes in frequency and load response. Thus, the loop-gain for the element control loop may vary.

Dynamic Pole Tracking Performance

To achieve stability over a wide frequency range for a load producing varying inertial response, dynamic pole-tracking of pole $P_J$ is provided. By controlling the zero $<Z_V>$ in the error amplifier 21, the main control feedback loop may achieve a constant loop bandwidth and phase margin. For the desired ideal element loop response and pole/zero placement, the zero $Z_V$ is placed directly in line with the pole $P_J$ in reference to the frequency. As the pole moves, the zero is moved under system control to approximately track the frequency of the pole, $P_J$. However, for the element loop to achieve this response and pole/zero placement, it is necessary to control the loop-gain of the element loop. Changing the element loop-gain, however, changes its bandwidth, which in turn has a detrimental effect on dynamic response.

For a system according to an embodiment of this invention which is to allow a variation of pole, $P_J$, by a factor of 100:1, the pole-tracking zero, $Z_V$, is to follow the pole change over the 100:1 dynamic range. In the process of setting the zero to track the pole, the element loop-gain also changes non-linearly over a range of 100:1. To do so in a nondetrimental fashion, however, common-mode gain may be applied by including a second adjustable feedback component matching the value of the feedback component in the control feedback loop in the element feedback loop only in a position to have an inverse effect on the loop-gain of the element loop. By employing this inverse loop-gain effect, both the control loop and the element loop exhibit the constant loop response over the entire dynamic range of interest. Even though the pole, $P_J$, may vary under such dynamic conditions between a minimum value and a maximum value, the variation of the tracking zero will uniformly track the pole with no detrimental effect on the dynamic response of the element loop.

Figure 2:
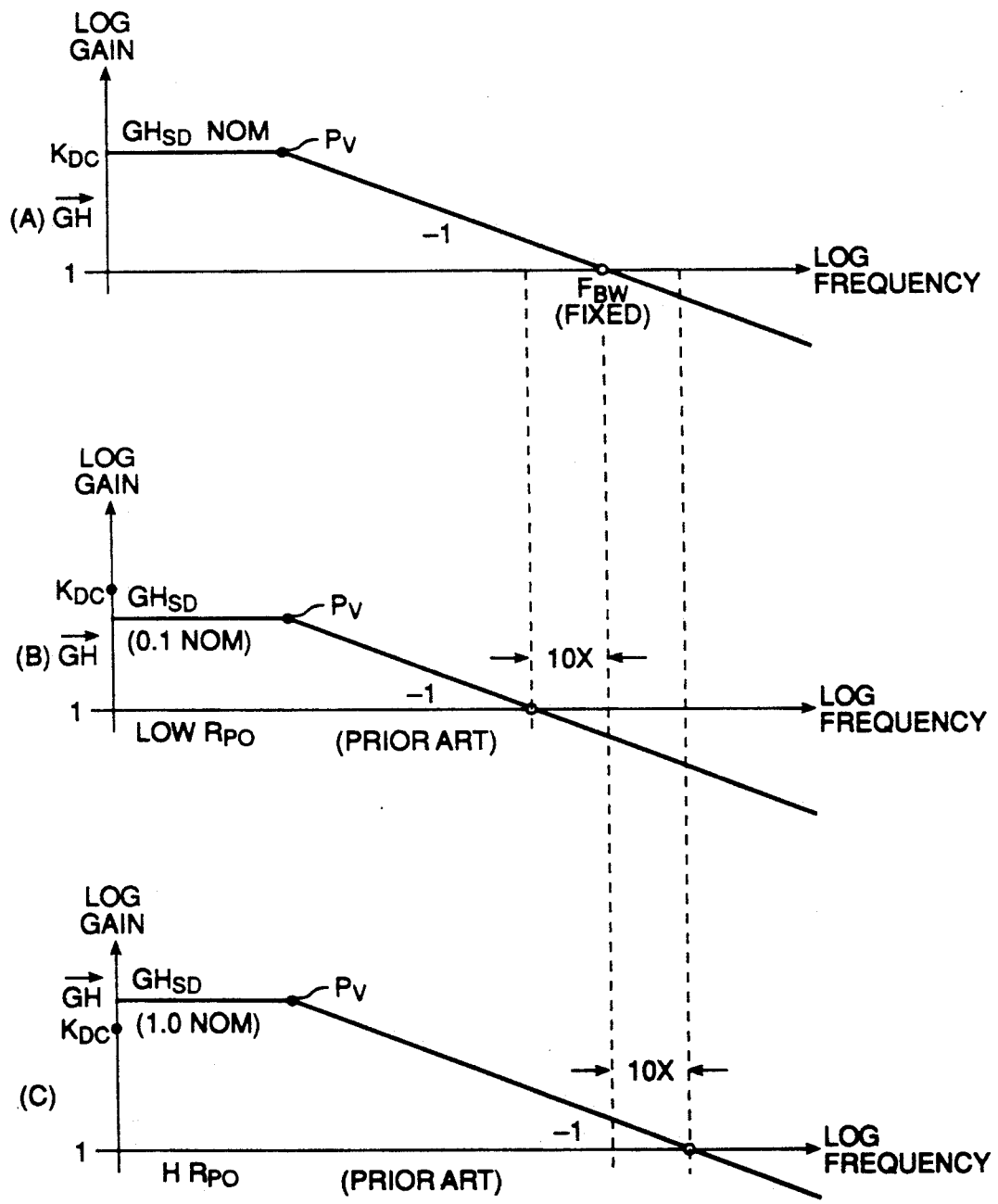
FIGS. 2A, 2B and 2C are Bode plots of an element feedback loop's loop-gain, GH, under varying operating loads.

FIG. 2A is a graph depicting element loop-gain of the element loop only according to the invention wherein loop-gain GH and therefore bandwidth $F_{BW}$ is fixed by matching the programmable resistance $R_{PRO}$ of the control feedback loop with an inverse gain in the element feedback loop. According to one embodiment of this invention, a gain normalization circuit 40 is provided (FIGS. 3, 4, 5) so as to provide the inverse of the programmable resistance $R_{PRO}$. FIG. 2B shows the prior art element loop response where there is no programmable loop-gain control and yet the loop-gain GH is one tenth of nominal. The result is a lower closed-loop bandwidth and therefore slower dynamic response. FIG. 2C shows the prior art element loop response where there is no programmable loop-gain control and yet the loop-gain GH is ten times nominal. The result is a higher closed-loop bandwidth and faster and more significantly inconsistent response.

The dc gain, $K_{DC}$, is the constant from the $GH_{VEL}$ equation. Specifically:

$$K_{DC} = -(R^D_{FWD}/R_v)(E_{VEL}/V_E)$$

The pole, $P_v$, also is fixed. Further, the equation for the zero, $Z_v$ is given below:

$$<Z_v> = [2\pi * R_{PRO} * C_1]^{-1}$$

Referring to such equation, $C_1$ is fixed, while $R_{PRO}$ is a voltage controlled resistance. As a result, $R_{PRO}$ needs to be changed in a hyperbolic manner for the zero, $Z_V$, to track the pole, $P_J$. The loop-gain of the element loop, $GH_{SD}$, component $dR_{PRO}/dE_4$, a derivative, is proportional to $R_{PRO}$ and therefore is nonlinear.

For the pole-tracking concept to operate alone without further compensation, the following conditions apply:

(a) $P_J^{max} Z_v^{max}$ to be 10% of $F_{SD}$ or $F_{BW}$ of controlled loop, whichever is lower in frequency;

(b) $P_J^{min} = Z_V$ min to 10 times the frequency of $P_V$, which is equal to $F_{BW}/GH_{DC}$; and (c) In the frequency range from the frequency of $P_V$ to approximately 1.5 times the bandwidth $F_{BW}$ of the controlled loop, no poles or zeros other than $P_J$ and $Z_V$ are allowed.

Improving Dynamic Response By Generating Common Mode Gain

Figure 3:
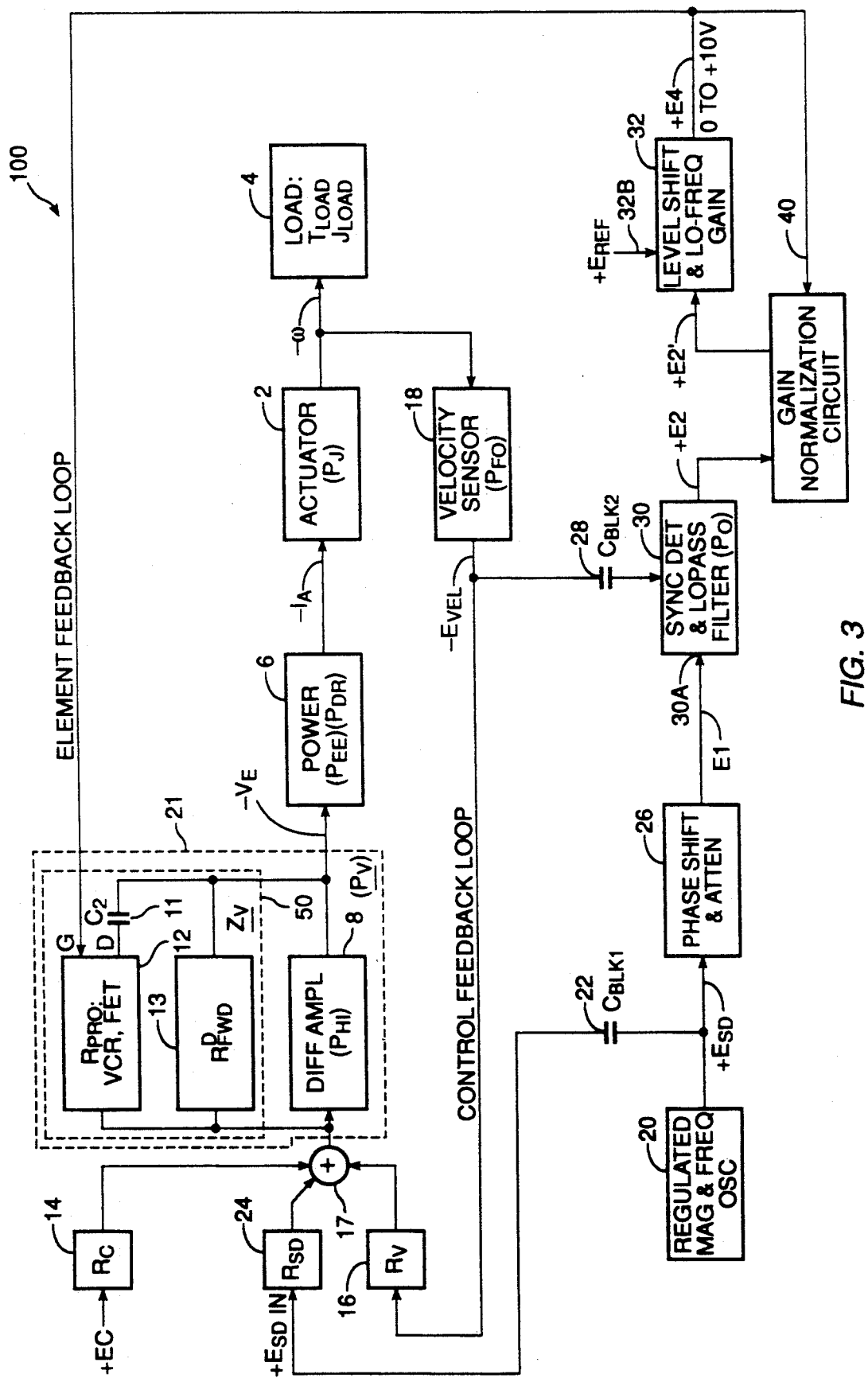
FIG. 3 is a block diagram of a velocity motion control system according to an embodiment of this invention.

To offset the nonlinear movement of pole $P_J$ and maintain a stable control system response over wide dynamic conditions, a gain normalization circuit 40 is placed in the element control loop. FIG. 3 shows a motion control system 100' including the components of the system 100, along with the gain normalization circuit 40. The function of the gain normalization circuit 40 is to put the identical $R_{PRO}$ into the input path of an additional amplifier so as to remove $R_{PRO}$ from the $GH_{SD}$ equation. As a result, $R_{PRO}$ can be changed smoothly so that $Z_V$ tracks the pole $P_J$ changes.

Figure 4:
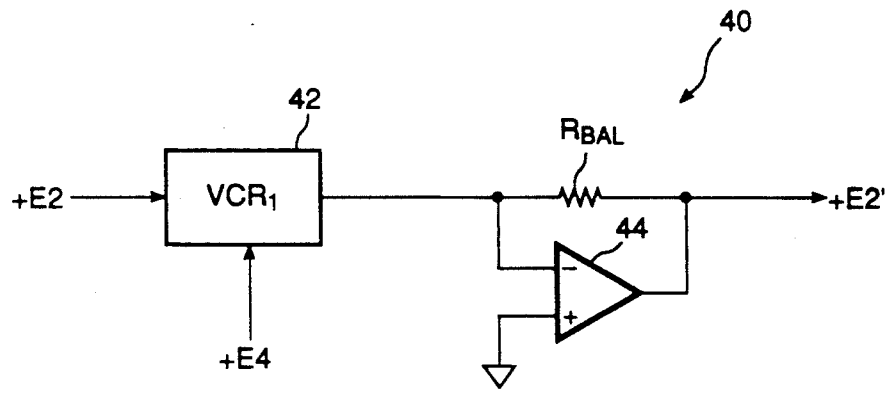
FIG. 4 is a block diagram of the gain normalization circuit of FIG. 3.

FIG. 4 shows the circuit diagram for the gain normalization circuit 40. A voltage controlled resistor $VCR_1$ 42 receives the filter 30 output signal E2 and the level shifter 32 feedback signal E4. The feedback signal E4 defines the resistance for $VCR_1$. The attenuated E2 signal then passes into the inverting input of operational amplifier 44 and into a balancing resistor $R_{BAL}$ coupled across the amplifier output and inverting input. The non-inverting input of amplifier 44 is coupled to ground. The amplifier 44 output forms the adjusted signal E2' which is input to the level shifter 32.

The equation for $G_{norm}$ is:

$$G_{norm} = R_{BAL}/VCR_1,$$

where $VCR_1 = R_{PRO}$

Thus, a portion, $(dR_{PRO}/dE4)(G_{norm}/|P_J|)$, of the control loop-gain equation becomes approximately constant.

The loop-gain equation for the main control feedback loop is unchanged relative to the prior art system 100, except that the variation of $Z_V$ is controlled to track the variations in $P_J$. The main control loop-gain equation is repeated below showing the tracking nature of the system 100' main control loop.

$$GH_{VEL} = (G_{VEL}^{DIFF})(G_{PWR\ AMP})(G_{ACTUATOR})(G_{SENSOR})$$

$$GH_{VEL} = -(R_{FWD}^D/R_V)(E_{VEL}/V_E)\left[\frac{(1-E)<Z_V>\ \text{(tracker)}}{[<P_V><P_J>F_{BW}<P_{Fo}><P_{EE}><P_{HI}><P_{DR}>]}\right]$$
(fixed)   (set)   (fixed)   (fixed)
(tracked)  (vary)
←Log Lo-freq                                log hi-freq→

$$GH_{VEL} = K_{DC}\left[\frac{(1-E)<Z_V>\ \text{(tracker)}}{[<P_V><P_J>F_{BW}<P_{Fo}><P_{EE}><P_{HI}><P_{DR}>]}\right]$$
(fixed)   (set)   (fixed)   (fixed)
(tracked) (fixed)          (vary)
←Log Lo-freq                                log hi-freq→ where:

$Z_V = P_J$ and may vary from Fmin to 100 Fmin;

$GH_{VEL}$ = constant, with constant bandwidth and constant phase margin (e.g., constant regulated performance).

The loop-gain equation for the element feedback loop including the normalization circuit 40 is as follows:

$$GH_{SD} = -(E_{SD}^{IN}/R_{SD})(dR_{PRO}/dE4)(dE_{VEL}/dV_E)(G_{SD})(G_{LPF})(G_{NORM})(G_{LS})$$

$$= -(E_{SD}^{IN}/R_{SD})(E_{VEL}/V_E)\,|\,[(G_{SD})(G_{LPF})(G_{LS})/(1 + jF_{BW}^{VEL}/F_{SD})]$$

$$|\ f < P_J$$

$$*\ [(R_{PRO}/E4)(G_{NORM})/(1 + jF_{SD}/P_J)]$$

$$= K_{SD} * [(R_{PRO}/E4)(G_{NORM})/(1 + jF_{SD}/P_J)]$$

Thus, $$GH_{SD}/K_{SD} = -(R_{PRO}/E4)(G_{NORM})(1 + jF_{SD}/P_J)^{-1}$$
$$= (\ )\quad(\ )\quad(\ )$$

Plugging in the equation for $G_{NORM}$ for an $R_{BAL} = 800$ kilohms:

$$GH_{SD}/K_{SD} = -(R_{PRO}/E4)(80\ \text{kilohms}/R_{PRO})(1 + jF_{SD}/P_J)^{-1}$$

Table 1 provides an analog example of how $GH_{SD}$ varies over a 100:1 change in $P_J$, both with and without $G_{NORM}$.

TABLE 1

| Analog Implementation of $GH_{SD}/K_{SD}$ |
| --- |

Given:

(1) A VCR-type FET, with $V_{DS} = R_{PRO}^= \dfrac{5.66K\Omega\ \text{nom}}{(1 - E4/3.54V_{nom})^{1.216}}$, where $E4 = 3.54\ V_{nom}[1 - (5.66K\Omega/R_{PRO})^{-1.216}]$ ANALOG
(2) G NORM, $\sigma = 80k\Omega/R_{PRO}$, per FIG. 4.

TABLE 1-continued

Analog Implementation of $GH_{SD}/K_{SD}$ (3) $(1 + )^{40 \, max} = \dfrac{R_{PROmax} = 800K\Omega}{R_{PROmin} = 8.00K\Omega} \longrightarrow 100X$; Thus, $= 0.122018X$.

(4) Nominals: $P_J = 100$ mHz; $F_{SD} = 150$ Hz; $R_{PRO} = 80.0K\Omega$ and $C_1 = 19.89\mu F$ @ $E_4 = 3.139083V$;

(5) Thus, $GH_{SD}/K_{SD}$, without G $\overset{ANALOG}{NORM} = /\beta$, or $\longrightarrow \overset{\uparrow \uparrow}{pu}$ when referred to Nominal/mid-range of $P_J$ and $R_{PRO}$.

(6) Thus, $GH_{SD}/K_{SD}$, with G $\overset{ANALOG}{NORM} = (\,_{pu})(\sigma)$ when referred to Nominal/mid-range of $P_J$ and $R_{PRO}$. $\overset{\uparrow \uparrow}{}$

| ($X_{nom}$) $R_{PRO}/80K\Omega$ | (K$\Omega$)* $R_{PRO}$ | (K$\Omega$)d$R_{PRO}$ d$R_{PRO}$ | (V) dE$_4$ | (mV) dE$_4$ | Thus, (K$\Omega$/mV) d$R_{PRO}$/dE4 | (x) $(1 + j150Hz/Pj)$ | ($\Omega$/mV) /$\beta$ | / = | Thus, (5) (FIG. 4) pu x $\sigma$ (x) /nom | (6) = ($_{pu}$)($\sigma$) (x) 80k$\Omega$/$R_{PRO}$ | (x) |
|---|---|---|---|---|---|---|---|---|---|---|---|
| 1/10X | 8.000000 | 0.921543 | 0.876682 | 252.253 | 3.6532m | 150.00 | 0.024355 | | 1/6.6430 | 10.00 | 1.5053 |
| 1/5X | 15.962088 | 1.838720 | 2.030919 | 142.931 | 12.9644m | 300.00 | 0.042881 | | 1/3.7730 | 5.000 | 1.3252 |
| 1/2X | 40.094979 | 4.618655 | 2.832437 | 67.0159 | 68.9188m | 750.00 | 0.091892 | | 1/1.7607 | 2.000 | 1.1359 |
| 1 = NOM. | 80.00000 | 9.215428 | 3.139083 | 37.9725 | 0.0242687 | 1,500.0 | 0.161798 | | 1.0000 | 1.0000 | 1.0000 |
| 2X | 159.62098 | 18.38720 | 3.312834 | 21.5159 | 0.854587 | 3,000.0 | 0.284862 | | 1.7607 | 0.5000 | 1/1.1359 |
| 5X | 400.94978 | 46.18655 | 3.433488 | 10.0882 | 4.57827 | 7,500.0 | 0.610436 | | 3.7730 | 0.2000 | 1/1.3252 |
| 10X | 800.0000 | 92.15428 | 3.478649 | 5.71588 | 16.1225 | 15,000. | 1.07483 | | 6.6433 | 0.1000 | 1/1.5053 |

As shown by table 1, the prior art non-normalized element loop's loop-gain, GH, and therefore its bandwidth and dynamic response varies ±6.64X -vs- ±10X $P_J$ full-range changes. Thus, uniform, full-range, dynamic response is not achieved over the range provided.

The normalized element loop's loop-gain, GH, variation is reduced from ±6.64X±50.5% -vs- ±10X $P_J$ full-range changes, when using an identical $R_{PRO}$ for elements 12 and 42. Thus, an acceptable uniform, full-range, dynamic response is achieved. By controlling the resistance of $R_{PRO}$ 42 to change by 60% to 73% relative to the resistance of $R_{PRO}$ 12 for the same input, E4, the element loop's loop-gain GH changes from ±6.64X to less than ±10% -vs- $P_J$ full-range changes. Such response is an acceptable uniform, full-range, dynamic response for essentially all systems requiring good dynamic response.

Table 2 provides a digital example of how $GH_{SD}$ varies over a 100:1 change in $P_J$, both with and without $G_{NORM}$.

TABLE 2

Digital Implementation of $GH_{SD}/K_{SD}$

GIVEN:

(1) A 16-Bit Resistor Lattice, so that $R_{PRO} = (840k\Omega \, max./6,5536V) * E_4$, where $8.00k\Omega \leq R_{PRO} \leq 8000k\Omega$ $62.415mV \leq E_4 \leq 6,2415V$ $624.15 \leq Counts \leq 62,415$ 12.817$\Omega$ Resol.  100$\mu$V Resol.
(0.16% of 8.00k$\Omega$ min.)

(2) G $\dfrac{Digital}{Norm} = 1/\sigma = R_{PRO}/R_{BAL}$ (where $R_{BAL} = 80k\Omega$)

$G_{Norm}$ uses an 8-Bit-or-greater $R_{PRO}/80K\Omega$ Resistor Lattice to keep $GH_{SD}$'s Bandwidth to within ± 0.9% of SET.
$G_{Norm}$ uses upper bits of 16-Bit A/D following E4.

(3) $(1 + )^{40 \, max} = \dfrac{R_{PRO} \, max = 800k\Omega}{R_{PRO} \, min = 8.00k\Omega} \longrightarrow 100x$; Thus, $= 0.122018x$.

(4) Nominals: $P_3 = 100$mHz; $F_{SD} = 150$Hz; $R_{PRO} = 80.0k\Omega$ and $C_1 = 19.89\mu F$ @ $E_4 = 0.624152V$;

(5) Thus, $GH_{SD}/K_{SD}$, without G $\overset{Digital}{Norm} = \alpha/\beta$, or $\longrightarrow \overset{\uparrow \uparrow}{pu}$ when referred to Nominal/mid-range of $P_J$ and $R_{PRO}$.

(6) Thus, $GH_{SD}/K_{SD}$, with G $\dfrac{Digital}{Norm} = (\,_{pu})(1/\sigma)$ when referred to Nominal/mid-range of $P_J$ and $R_{PRO}$. $\overset{\uparrow \uparrow}{}$ TABLE 2-continued Digital Implementation of $GH_{SD}/K_{SD}$ (7) Updating $F_{ek} \geq (20x) F_{SD} \longrightarrow \geq 3kHz$.

| ($X_{Nom.}$) $R_{PRO}/80k\Omega$ | (k$\Omega$) $R_{PRO}$ | (v) -vs- $E_4$ | $\alpha/\beta = \delta$ Thus, (k$\Omega$/mV) $R_{PRO}/dE_4$ | $1 + j(150Hz/P_J)$ | ($\Omega$/mV) $\alpha/\beta$ | (x) $\underline{x}$ Nom. | (x)Nom. $R_{PRO}/80k\Omega$ | $_{pu} \times 1/\sigma = (_{pu})(1/\sigma)$ (x) |
|---|---|---|---|---|---|---|---|---|
| 1/10x | 8.00000 | 0.062415 | 0.128174 | 150.00 | 0.854492 | 10.0000 | 1/10x | 1.0000 |
| 1/5x | 16.00000 | 0.124830 | 0.128174 | 300.00 | 0.427246 | 5.0000 | 1/5x | " |
| 1/2x | 40.00000 | 0.312076 | 0.128174 | 750.00 | 0.170898 | 2.0000 | 1/2x | " |
| 1 = Nom. | 80.00000 | 0.624152 | 0.128174 | 1,500.00 | 0.085449 | 1.0000 | 1.0000 | 1.0000 |
| 2x | 160.0000 | 1.248305 | 0.128174 | 3,000.00 | 0.042,725 | 0.5000 | 2x | " |
| 5x | 400.0000 | 3.120762 | 0.128174 | 7,500.00 | 0.017,0898 | 0.2000 | 5x | " |
| 10x | 800.0000 | 6.241524 | 0.128174 | 15,000.00 | 0.008,5449 | 0.1000 | 10x | " |

As shown by table 2, the prior art non-normalized element loop's loop-gain, GH, and therefore its bandwidth and dynamic response, varies ±10X -vs- ±10X $P_J$ over full-range changes. Thus, uniform, full-range, dynamic response is not achieved over the range provided.

To minimize "tracking granularity", a 16-bit resistor lattice may be used as element 12's $R_{PRO}$ to keep error to 0.16% at minimum $R_{PRO}$ value. (Such lattice is driven by a 16-bit analog-to-digital converter, A/D, as input by signal E4.) Alternatively, even greater than 16-bit precision may be applied.

A digital normalization circuit 40 is inverted to analog format to attenuation by the inertia pole. The "granularity" of such circuit 40 can be much greater, as element 42, than that of element 12 since element 42's granularity affects only the element loop's loop-gain, GH, and therefore its bandwidth and dynamic response. Accordingly, only 8-bits keep bandwidth variations to less than ±0.9% of that SET. This may achieve more than 11 times better control over bandwidth variations than that achieved by analog means.

Figure 5:
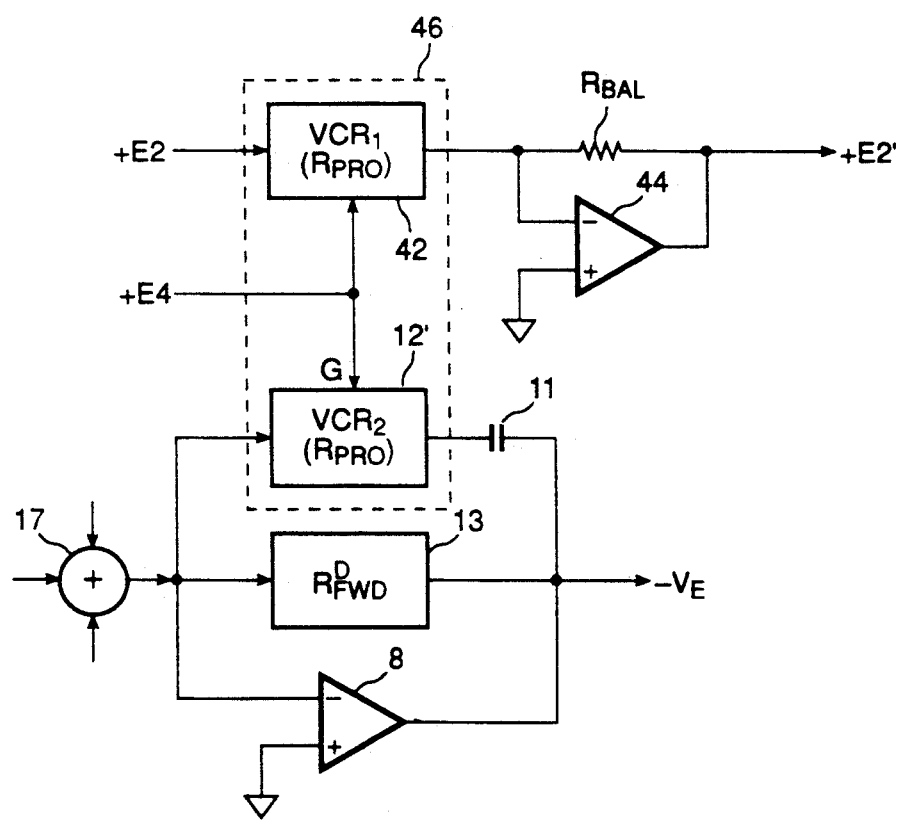
FIG. 5 is a block diagram showing the voltage controlled resistors of the error amplifier and the gain normalization circuit to be commonly mounted to a temperature-regulating heat sink.

To obtain precise matching of the VCR$_1$ 42 and $R_{PRO}$ (VCR$_2$ 12') both are mounted on a common temperature-regulated heat sink 46 as shown in FIG. 5. Preferably, the heat sink temperature is maintained at approximately 10 degrees (Celsius) above the ambient temperature.

CONCLUSION

Although a preferred embodiment of the invention has been illustrated and described, various alternatives, modifications and equivalents may be used. Therefore, the foregoing description should not be taken as limiting the scope of the inventions which are defined by the appended claims.

What is claimed is:

1. A feedback control system for controlling a parameter of a load element by a first feedback loop, said load element having a dynamic response producing an output signal which varies non-linearly over an operating frequency range, said system comprising:
   means for generating a first feedback signal from the output signal to form said first feedback loop, said first feedback signal corresponding to the difference between a desired value and an actual value of the parameter;
   means for compensating said first feedback signal for variations in said load element's dynamic response, said compensating means coupled to said first feedback loop and comprising a first variable resistance means and a capacitive means, the first variable resistance means defining a resistance;
   means for generating an element feedback signal coupled to said compensating means for causing said compensated first feedback signal to vary directly with variations in frequency response of said load element so as to generate a "zero" to track and substantially cancel a "pole" of the dynamic response of said load element; and wherein
   said element feedback signal generating means comprises a second variable resistance means for defining a resistance substantially equal to the resistance defined by said first variable resistance means so as to maintain loop-gain and bandwidth of the first feedback loop generally constant over the operating frequency range.

2. The system of claim 1 further comprising a first amplifying means in said first feedback loop, said first variable resistance means coupled across the input and output of said first amplifying means; and in which the element feedback signal generating means further comprises a second amplifying means coupled in series with said second variable resistance means, and a third resistance means coupled across an input and output of the second amplifying means.

3. The system of claim 2 in which said element feedback signal is coupled to said first variable resistance means and said second variable resistance means for defining resistance for said first and second variable resistance means.

4. The system of claim 3 in which said first variable resistance means and second variable resistance means are coupled to a common heat sinking means.

5. The system of claim 4 in which said heat sinking means maintains the first and second variable resistance means at approximately 10 degrees (Celsius) above ambient temperature.

6. A feedback control system for controlling a parameter of a load element by a first feedback loop, said load element having a dynamic response producing an output signal which varies non-linearly over an operating frequency range, said system comprising:
   means for generating a first feedback signal from the output signal to form said first feedback loop, said first feedback signal corresponding to the difference between a desired value and an actual value of the parameter;
   means for compensating said first feedback signal for variations in said load element's dynamic response, said compensating means coupled to said first feedback loop and comprising a first variable resistance means and a capacitive means, the first variable resistance means defining a resistance;

means for generating an element feedback signal coupled to said compensating means for causing said compensated first feedback signal to vary directly with variations in frequency response of said load element so as to generate a "zero" to track and substantially cancel a "pole" of the dynamic response of said load element; and wherein said element feedback signal generating means comprises means for generally eliminating non-linearity of the element feedback signal during said tracking.

7. The apparatus of claim 6 in which said eliminating means comprises a second variable resistance means for defining a resistance substantially equal to the resistance defined by said first variable resistance means so as to maintain loop-gain and bandwidth of the first feedback loop generally constant over the operating frequency range.

8. The system of claim 7, further comprising a first amplifying means in said first feedback loop, said first variable resistance means coupled across the input and output of said first amplifying means, and in which said eliminating means further comprises:

a second amplifying means coupled in series with said second variable resistance means; and a third resistance means coupled across an input and output of said second amplifying means.

9. The system of claim 8 in which said element feedback signal is coupled to said first variable resistance means and said second variable resistance means for defining a resistance for said first and second variable resistance means.

10. The system of claim 9 in which said first variable resistance means and second variable resistance means are coupled to a common heat sinking means.

11. A method for controlling a parameter of a load element in a feedback control system having a first feedback loop, said load element having a dynamic response producing an output signal which varies non-linearly over an operating frequency range, said method comprising the steps of:

generating a first feedback signal from the output signal to form said first feedback loop, said first feedback signal corresponding to the difference between a desired value and an actual value of the parameter;

generating a compensating signal for compensating said first feedback signal for variations in the element's dynamic response with a first variable resistance means and a capacitive means coupled to said first feedback loop;

generating an element feedback signal coupled to said first variable resistance means for causing said compensating signal to vary directly with variations in frequency response of said element so as to generate a "zero" to track and substantially cancel a "pole" of the variable frequency response of said element, said element feedback signal forming a second feedback loop; and said element feedback signal also being fed back a second variable resistance means within said second feedback loop for defining a resistance at said second variable resistance means substantially equal to the resistance defined by said first variable resistance means so as to maintain loop-gain and bandwidth of the first feedback loop generally constant over said operating frequency range.

* * * * *